United States Patent
Papaioannou et al.

(10) Patent No.: US 11,566,561 B2
(45) Date of Patent: Jan. 31, 2023

(54) FRONT END ACCESSORY DRIVE WITH MULTIPLE SPEED RATIOS

(71) Applicant: FORD GLOBAL TECHNOLOGIES, LLC, Dearborn, MI (US)

(72) Inventors: George Aristidis Papaioannou, Livonia, MI (US); Timothy Vaughn, Woodhaven, MI (US); Nicholas Dahlin, Plymouth, MI (US); John Edward Brevick, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 183 days.

(21) Appl. No.: 16/995,240

(22) Filed: Aug. 17, 2020

(65) Prior Publication Data
US 2022/0049647 A1 Feb. 17, 2022

(51) Int. Cl.
F02B 67/00 (2006.01)
F02B 67/06 (2006.01)
F02N 11/04 (2006.01)
B60K 25/00 (2006.01)
F02N 15/04 (2006.01)

(52) U.S. Cl.
CPC .............. *F02B 67/06* (2013.01); *F02N 11/04* (2013.01); *B60K 2025/005* (2013.01); *F02B 2275/06* (2013.01); *F02N 15/046* (2013.01)

(58) Field of Classification Search
CPC ...... F02B 67/06; F02B 2275/06; F02N 11/04; F02N 15/08; F02N 15/046; F02N 2200/0801; B60K 2025/005; B60K 25/00
See application file for complete search history.

(56) References Cited

U.S. PATENT DOCUMENTS

| | | | | |
|---|---|---|---|---|
| 7,552,705 B2* | 6/2009 | Serkh | ..................... | B60W 20/10 180/65.21 |
| 7,582,034 B2* | 9/2009 | Usoro | ..................... | B60K 25/02 475/5 |
| 7,727,115 B2* | 6/2010 | Serkh | ....................... | B60K 6/48 475/210 |
| 8,166,945 B2* | 5/2012 | Spicer | ................... | F16D 27/112 123/179.25 |
| 8,216,113 B2* | 7/2012 | Parsons | ................. | F02N 11/003 180/53.8 |

(Continued)

FOREIGN PATENT DOCUMENTS

JP 2007069860 A 3/2007
JP 2007518037 A 7/2007

*Primary Examiner* — Phutthiwat Wongwian
*Assistant Examiner* — Sherman D Manley
(74) *Attorney, Agent, or Firm* — David B Kelley; Brooks Kushman P.C.

(57) ABSTRACT

A vehicle includes an engine having a crankshaft, an electric machine having a shaft, and a front end accessory drive (FEAD). The FEAD includes a multi-speed pulley assembly mounted to one of the crankshaft and the shaft, a pulley mounted to the other of the crankshaft and the shaft, and a tension member trained around the multi-speed pulley assembly and the pulley. The multi-speed pulley assembly is configured to establish a low speed ratio between the shaft and the crankshaft and a high speed ratio between the shaft and the crankshaft. A vehicle controller is programmed to, in switch between the high speed ratio and the low speed ratio to optimize operating conditions of the FEAD.

16 Claims, 8 Drawing Sheets

(56) References Cited

U.S. PATENT DOCUMENTS

| | | | | |
|---|---|---|---|---|
| 8,328,673 B2 * | 12/2012 | Smith | ................ | B60W 10/115 |
| | | | | 475/5 |
| 8,328,674 B2 * | 12/2012 | Swales | ................ | B60K 6/48 |
| | | | | 475/5 |
| 8,454,463 B2 * | 6/2013 | Parsons | ................ | F02N 11/04 |
| | | | | 474/166 |
| 8,475,316 B2 * | 7/2013 | Hoffman | ................ | F16H 37/0853 |
| | | | | 475/210 |
| 8,479,847 B2 * | 7/2013 | Hart | ................ | B60K 6/485 |
| | | | | 180/65.265 |
| 8,757,119 B2 * | 6/2014 | Suzuki | ................ | B60K 6/00 |
| | | | | 475/5 |
| 8,808,124 B2 * | 8/2014 | Major | ................ | B60K 25/00 |
| | | | | 180/65.265 |
| 9,845,781 B2 * | 12/2017 | Marthaler | ................ | F02N 11/003 |
| 10,676,079 B1 * | 6/2020 | Bucknor | ................ | B60W 20/10 |
| 2004/0250788 A1 * | 12/2004 | Carden | ................ | B60L 50/16 |
| | | | | 123/192.2 |
| 2011/0165982 A1 | 7/2011 | Hoffman et al. | | |
| 2016/0327004 A1 * | 11/2016 | Cho | ................ | F02N 11/006 |
| 2020/0331337 A1 * | 10/2020 | Fliearman | ................ | F16H 3/666 |
| 2022/0099165 A1 * | 3/2022 | Burcar | ................ | F02B 67/06 |

* cited by examiner

FRONT END ACCESSORY DRIVE WITH MULTIPLE SPEED RATIOS

TECHNICAL FIELD

This disclosure relates to front end accessory drives for engines and more particular to multispeed front end accessory drives for use with belt-integrated starter generators.

BACKGROUND

Engines include a front end accessory drive (FEAD) for powering accessories such as a water pump, a power steering pump, an alternator, and air conditioning. The engine crankshaft and each of the accessories includes a pulley. One or more belts is trained around the pulleys to drivably connect the accessories to the crankshaft.

Some hybrid vehicles include a starter/generator, such as a belt integrated starter/generator (BISG) that is connected to the FEAD. The BISG is electrically connected to a battery. The BISG may be used to provide additional drive torque.

SUMMARY

According to one embodiment, a vehicle includes an engine having a crankshaft, an electric machine having a shaft, and a front end accessory drive (FEAD). The FEAD includes a tension member operably connecting the crankshaft and the shaft and a gearing arrangement configured to establish a first speed ratio between the crankshaft and the shaft when in a first condition and a second speed ratio between the crankshaft and the shaft when in a second condition. The second speed ratio is higher than the first speed ratio. A vehicle controller is programmed to, in response to a request to start the engine with the electric machine, command the gearing arrangement to the second condition and command the electric machine to start the engine.

According to another embodiment, a vehicle includes an engine having a crankshaft, an electric machine having a shaft, and a front end accessory drive (FEAD). The FEAD includes a multi-speed pulley assembly mounted to one of the crankshaft and the shaft, a pulley mounted to the other of the crankshaft and the shaft, and a tension member trained around the multi-speed pulley assembly and the pulley. The multi-speed pulley assembly is configured to establish a low speed ratio between the shaft and the crankshaft and a high speed ratio between the shaft and the crankshaft. A vehicle controller is programmed to, in response to a request for regenerative braking with the electric machine, command the multi-speed pulley assembly to establish the high speed ratio.

According to yet another embodiment, a vehicle includes an engine having a crankshaft, an electric machine having a shaft, and a front end accessory drive (FEAD). The FEAD includes a tension member operably connecting the crankshaft and the shaft and a gearing arrangement configured to establish a first speed ratio between the crankshaft and the shaft when in a first condition and a second speed ratio between the crankshaft and the shaft when in a second condition. The second speed ratio is larger than the first speed ratio. A vehicle controller is programmed to, in response to an electrical power output of the electric machine being less than a desired value, command the gearing arrangement to the second condition to increase the electrical power output.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
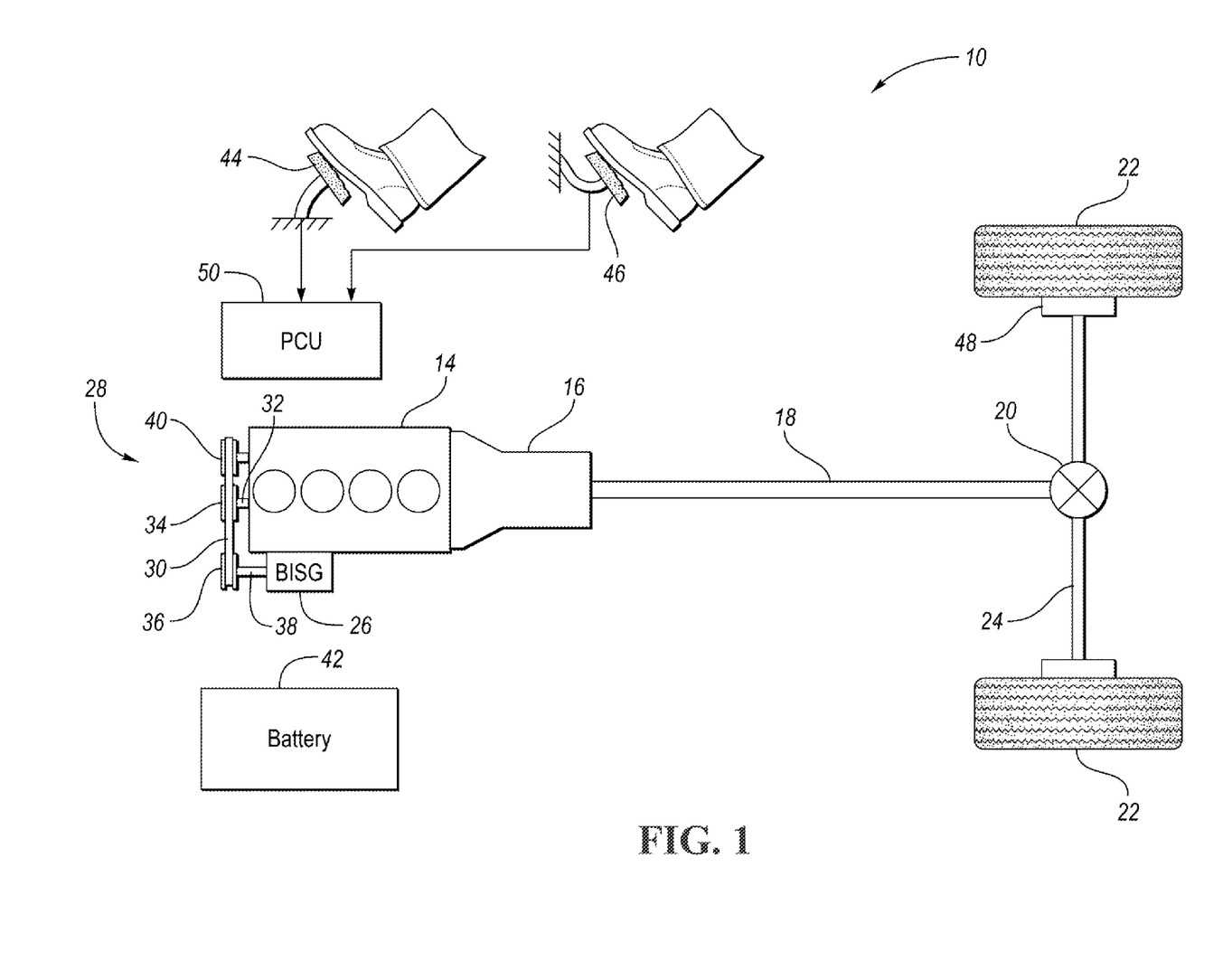
FIG. 1 is a diagram of a hybrid vehicle including a belt integrated starter-generator.

Referring to FIG. 1, a schematic diagram of a mild-hybrid electric vehicle (MHEV) 10 is illustrated according to an embodiment of the present disclosure. The vehicle 10 includes a powertrain 12. The powertrain 12 includes an engine 14 that drives a transmission 16, e.g., a multiple step-ratio automatic transmission. The engine 14 may be an internal combustion engine fueled by gasoline, diesel, or natural gas, etc. The output of the transmission 16 is coupled to a driveshaft 18 that transmits torque to a differential 20. The differential 20 distributes torque to the wheels 22 via shafts 24. The example vehicle 10 is shown with as rear-wheel drive, but maybe front-wheel drive, all-wheel drive, or four-wheel drive in other embodiments.

The powertrain 12 further includes an associated controller 50 such as a powertrain control module (PCM). While illustrated as one controller, the controller 50 may be part of a larger control system and may be controlled by various other controllers throughout the vehicle 10, such as a vehicle system controller (VSC). It should therefore be understood that the PCM 50 and one or more other controllers can collectively be referred to as a "controller" that controls various actuators in response to signals from various sensors to control functions such as operating the engine 14, operating the transmission 16, an electric machine, etc. Controller 50 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller communicates with various engine/vehicle sensors and actuators via an input/output (I/O) interface (including input and output channels) that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. The controller 50 may communicate signals to and/or from engine 14, the transmission 16, etc. Although not explicitly illustrated, those of ordinary skill in the art will recognize various functions or components that may be controlled by controller 50 within each of the subsystems identified above. Representative examples of parameters, systems, and/or components that may be directly or indirectly actuated using control logic and/or algorithms executed by the controller include fuel injection timing, rate, and duration, throttle-valve position, spark plug ignition timing (for spark-ignition engines), intake/exhaust valve timing and duration, front-end accessory drive (FEAD) components such as an alternator, air conditioning compressor, battery charging or discharging (including determining the maximum charge and discharge power limits), regenerative braking, electric machine operation, clutches, and the like. Sensors communicating input through the I/O interface may be used to indicate turbocharger boost pressure, crankshaft position, engine rotational speed (RPM), wheel, vehicle speed, coolant temperature, intake manifold pressure, accelerator-pedal position, ignition switch position, throttle-valve position, air temperature, exhaust gas oxygen or other exhaust gas component concentration or presence, intake air flow, transmission gear, ratio, or mode, transmission oil temperature, transmission turbine speed, torque converter bypass clutch status, battery temperature, voltage, current, or state of charge (SOC) for example.

The vehicle 10 includes a BISG 26 (sometimes called a Po motor/generator) that is connected to the FEAD 28. The BISG 26 generally replaces the alternator. The BISG 26 is an electric machine configured to act as a motor or a generator. BISG 26 may be a three-phase electric motor. The FEAD 28 includes a tension member, e.g., a belt 30, that operably couples the BISG 26 to the crankshaft 32 of the engine 14. For example, the engine 14 includes an associated pulley 34 that is supported on the crankshaft 32 and the BISG 26 includes an associated pulley 36 that is supported on a shaft 38 of the BISG 26. (As will be described in detail below, one of the pulleys 34 and 36 are part of a multi-speed pulley assembly.) The shaft 38 may be fixed to the rotor of the BISG 26 and may be referred to as a rotor shaft. The belt 30 is trained over these pulleys so that torque can be transmitted between the engine 14 and the electric machine 26. One or more accessories may include pulleys, generally illustrated as pulley 40, that is also engaged with the belt 30, or with a second belt that connects to the crankshaft. That is, the FEAD may include a single belt or multiple belts. The FEAD 28 allows the accessories to be powered by the engine 14, the BISG 26, or combination thereof.

The BISG 26 is electrically connected to a battery 42. The battery 42 may be a high-voltage or a low-voltage battery. For example, the battery 42 and the BISG 26 may be part of a 12V, 48 V, or 96 V, or 300 V electrical system. The BISG 26 may be connected to the battery 42 and other vehicle electrical systems though power electronics (not shown). The BISG 26 may be configured to operate as a motor to start the engine 14 during an engine start-up event, or to provide additional torque to the powertrain 12 during vehicle operations. The BISG 26 may also be configured to receiving torque from the engine 14 and operate as a generator to recharge the battery 42 and power electrical loads of the vehicle. The BISG 26 may further be configured to perform regenerative braking. The controller 50 may be configured to transmit signals to the BISG 26 to operate the BISG 26 as either a motor or a generator. The BISG 26 may be configured to provide electrical energy to charge the battery 72 or provide electrical energy to power the vehicle accessories when operating as a generator.

An accelerator pedal 44 is used by the driver of the vehicle to provide a demanded torque, power, or drive command (herein "driver-demanded torque") to propel the vehicle. In general, depressing and releasing the accelerator pedal 44 generates an accelerator-pedal position signal that may be interpreted by the controller 50 to determine the driver-demanded torque. A brake pedal 46 is also used by the driver of the vehicle to provide a demanded braking torque to slow the vehicle. In general, depressing and releasing the brake pedal 46 generates a brake-pedal position signal that may be interpreted by the controller 50 as a demand to decrease the vehicle speed. Based upon inputs from the accelerator pedal 44 and brake pedal 46, the controller 50 commands torque to the engine 14, the BISG 26, and friction brakes 48. The controller 50 is programmed to arbitrate the driver-demanded torque between the engine 14 and the BISG 26, and to arbitrate the braking torque between the regenerative braking via the BISG 26 and the friction brakes 48.

Depending upon the size of the vehicle and the power rating of the BISG 26, the vehicle may be propelled, at least at low speeds, by either the engine 14 or the BISG 26. For example, the vehicle 10 may include an electric creep mode in which the BISG 26 propels the vehicle when the engine 14 is OFF. (Creep refers to movement of the vehicle when the both brake pedal and the accelerator pedal are released.

Typical creep speeds are less than 10 miles per hour.) In other situations, both the engine 14 and the BISG 26 act as drive sources to propel the vehicle 10. The engine 14 generates engine power at the crankshaft that is added to by power output from the BISG 26 through the FEAD 28. This combined power is then sent to the driven wheels 22 though the transmission 16 and the drivetrain.

While the BISG 26 is shown as incorporated with a conventional powertrain, the BISG 26 could also be incorporated with a hybrid powertrain. Such an architecture is disclosed in Applicant's U.S. Pat. No. 10,519,917 (issued Dec. 31, 2019), the contents of which are incorporated in their entirety by reference herein.

In a traditional FEAD, the speed ratio between the crankshaft and the rotor shaft of the BISG are fixed based on the relative sizing of the pulleys. The engine is the controlling component and sets the speed of the FEAD. The optimum operating speeds of the BISG and the engine may be different resulting in reduced efficiency and functionality of the BISG. Generally, the BISG operates most efficiently at a much higher RPM than the engine. Additionally, the fixed speed ratio, which is chosen to provide best overall performance, may result in insufficient torque multiplication between the BISG and the engine to start the engine or optimize regenerative braking.

Figure 2:
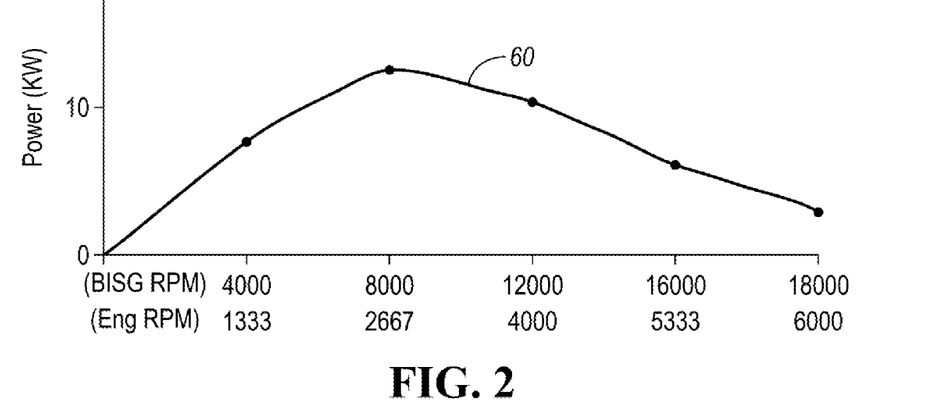
FIG. 2 illustrates an example plot showing electrical power output of the BISG over a range of speeds when connected to the engine at a 3:1 speed ratio.

FIG. 2 illustrates an example plot showing electrical power output of the BISG over a range of speeds, in revolutions per minute (RPM). In this example, BISG peak electrical output 60 is 13.4 kilowatts (kW) at 8000 RPM of the rotor shaft. Below the BISG speeds are the corresponding engine speeds. In this example, the FEAD has a 3:1 speed ratio between the BISG and the engine (BISG shaft rotates 3 times for every rotation of the crankshaft). With this speed ratio, the peak power output of the BISG is achieved at an engine speed of 2667 RPM, which is higher than a typical cruising RPM and much higher than normal idle, e.g., 650 RPM. At a normal idle of 650 RPM, and even at a high idle of 1500 RPM, the BISG is operating in an inefficient region. This may result in the BISG being unable to provide the necessary electrical output to satisfy all vehicle loads.

This disclosure proposes a multi-speed FEAD configured to optimize performance of the BISG and the engine. The multi-speed FEAD allows the vehicle 10 to preform duties that a typical mild hybrid are unable to perform and to perform traditional duties better. For example, the BISG 26 may be able to start a cold engine, enable rolling stop-start, decouple the crankshaft from the FEAD, power accessories, e.g., water pump and air conditioner, when the engine is OFF, propel the vehicle alone, improve regenerative braking, reduce engine fuel consumption by lowering engine speed, increasing electrical output, eliminate electric water pump and air-conditioning unit, eliminate the starter motor, etc.

Figure 3:
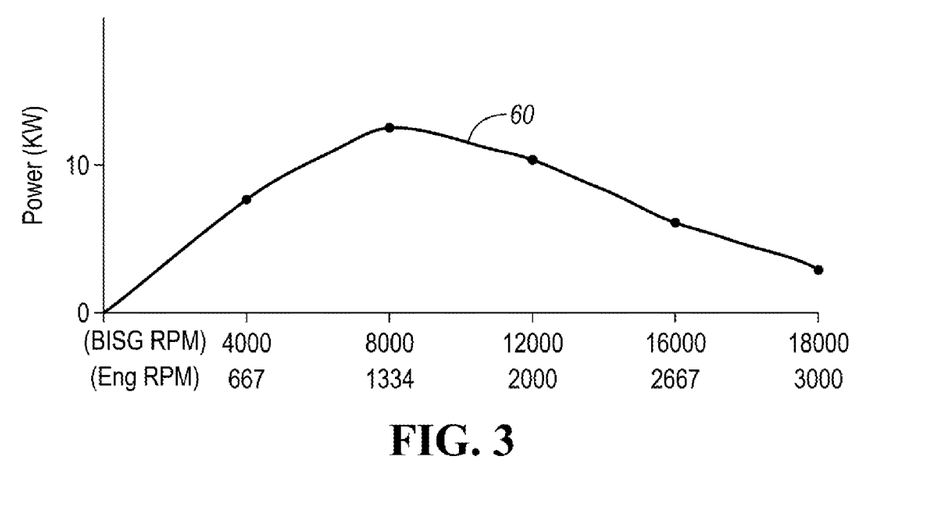
FIG. 3 illustrates an example plot showing electrical power output of the BISG over a range of speeds when connected to the engine at a 6:1 speed ratio.

FIG. 3 illustrates the same electrical power output 60 but at a 6:1 speed ratio. At this ratio, the BISG 26 is producing peak power output at engine speed of 1334 RPM (high idle) and the BISG 26 is in a favorable operating region between engine speeds of 667 and 2000 RPM, which is a fuel-efficient operating range for the engine.

The 6:1 speed ratio not only increases power output 60 at lower engine speeds but also provides increased BISG torque at the crankshaft. Assuming, for example, a peak BISG torque of 50 Newton Meters (Nm), the torque at the crankshaft is 150 Nm at the 3:1 ratio and is 300 Nm at the 6:1 ratio. Depending on engine conditions (e.g., temperature) and size, 150 Nm may be unable to start the engine whereas 300 Nm may be able to start the engine in all conditions. Thus, having a multi-speed FEAD allow for the BISG to start the engine by shifting to the higher speed ratio resulting in more torque at the crankshaft. Used herein "higher speed ratio" means that the components are rotating faster relative to each other than some other speed ratio, i.e., a 6:1 speed ration is higher than a 3:1 speed ratio. Used herein "lower speed ratio" means that the components are rotating slower relative to each other compared to some other speed ratio, i.e., a 3:1 speed ratio is lower than a 6:1 speed ratio. In this disclosure, speed ratios may also be described as larger or smaller relative to each other. Larger speed ratio means that the components are rotating faster relative to each other compared some other condition and a smaller speed ratio means that the components are rotation slower relative to each other compared to some other condition.

Figure 4A:
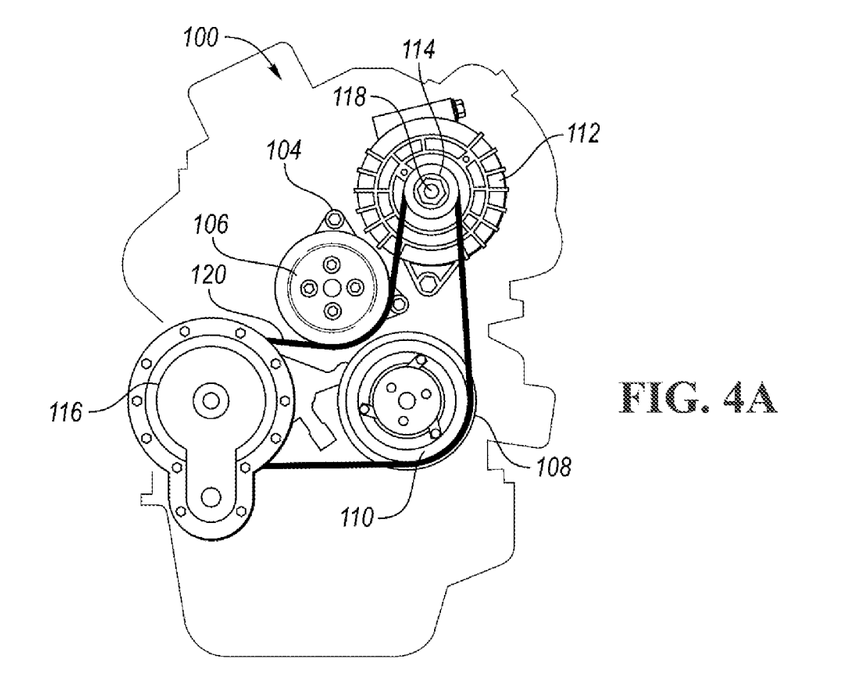
FIG. 4A is a front view of FEAD that has a multi-speed pulley assembly mounted to a crankshaft of the engine and a tension member trained around a BISG and at least one other accessory component.

Referring to FIG. 4A, an example FEAD 100 is shown for an example engine 102. The engine 102 and FEAD 100 may be used in the vehicle 10 or another vehicle. The engine 102 includes a water pump 104 that circulates coolant through the engine and the heater core of the vehicle climate control system. The water pump 104 includes a pulley 106 that is mounted on a rotatable shaft of the water pump. Mounted to the engine 102 is an air-conditioning compressor 108 that includes a pulley 110. Also mounted to the engine is a BISG 112 having a pulley 114 supported on the rotor shaft 118. The BISG 112 may be the same or similar to the BISG 26 described above. In this embodiment, a multi-speed pulley assembly 116 is supported by the crankshaft. The multi-speed pulley assembly 116 includes an input that receives power from the crankshaft and an output, which may be in the form of a pulley. The input may be rotationally fixed to the crankshaft. A tension member, e.g., belt 120, is trained around the pulleys 106, 110, 114, and the pulley of assembly 116. The belt 120, which drives multiple accessories, may be referred to as a serpentine belt. The multi-speed pulley assembly is configured to establish different speed ratios between the crankshaft and the accessories. For example, the multi-speed pulley assembly is configured to establish at least a first speed ratio between the crankshaft of the engine and the shaft 118 of the BISG 112 when in a first condition and a second speed ratio between the crankshaft and the shaft 118 when in a second condition. The FEAD 100 may include a belt tensioner (optional) and additional accessories, such as a power-steering pump.

The pulley assembly 116 is configured to have multiple speed ratios between the input and the output. For example, the pulley assembly may have two speed ratios between the input and the output, which in turn creates two speed ratios for the FEAD 100. The speed ratios may be referred to as a low speed ratio and a high speed ratio. For the pulley assembly 116, the low speed ratio may be direct drive (1:1) between the input and the output, i.e., the output is rotationally fixed to the crankshaft. Alternatively, the low speed ratio may have a speed ratio between the input and the output. For the high speed ratio, the output rotates faster than the crankshaft. The high speed ratio may have ratio between 1.1:1 to 3:1 between the output and the input. The overall speed ratio between the crankshaft and the BISG 112 (as well as the other accessories) is the fixed speed ratio set by the relative sizing of the pulleys multiplied by the speed ratio of the pulley assembly 116. For example, if the fixed speed ratio between the BISG 112 and the output pulley of the assembly 116 is 3:1, the low speed ratio is direct drive, and the high speed ratio is 2:1, then the speed ratio between BISG 112 and the crankshaft is 3:1 when the assembly 116 is the lower speed ratio and is 6:1 when in the high speed ratio. These values are merely exemplary and other ratios are contemplated.

Figure 4B:
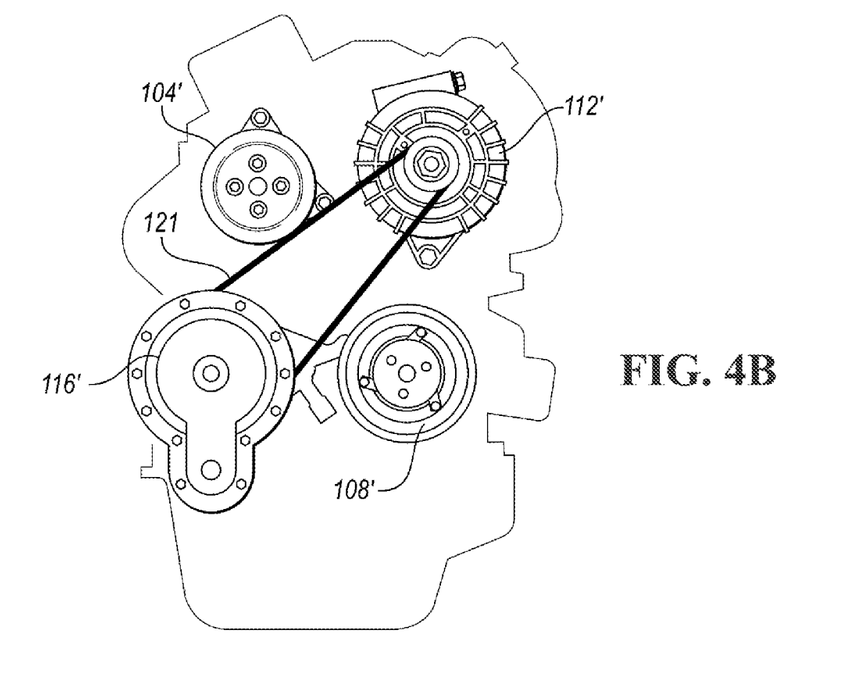
FIG. 4B is a front view of another FEAD that has a multi-speed pulley assembly mounted to a crankshaft of the engine and a dedicated tension member for a BISG.

FIG. 4B illustrates an alternative embodiment in which a dedicated tension member 121, e.g., a belt, is used to connect the BISG 112' to the pulley assembly 116'. The water pump 104' and the AC compressor 108' may be connected to the crankshaft at a fixed ratio by another belt drive (not shown) or similar device.

Figure 5:
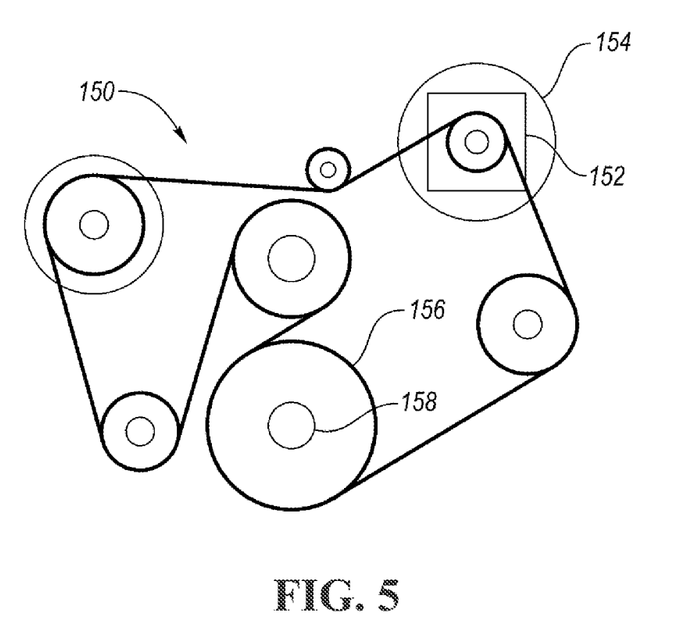
FIG. 5 is a diagrammatical view of yet another FEAD that has a multi-speed pulley assembly mounted to a BISG.

Referring to FIG. 5, in an alternative embodiment, the multi-speed pulley assembly may be mounted to the BISG rather than the crankshaft as described above in other embodiments. Another FEAD 150 includes a multi-speed pulley assembly 152 mounted to a BISG 154. In this embodiment, a pulley 156 connected to the crankshaft 158 such that the pulley 156 and crankshaft 158 are rotationally fixed. The multi-speed pulley assembly 152 may be similar to the above-described assembly 116. The multi-the pulley assembly 152 is configured to change a speed ratio between the rotor shaft 160 of the BISG 154 and a pulley 162 of the assembly 152. Changing this speed ratio, in turn, change the speed ratio between the engine and the BISG 154. One benefit of the mounting the multi-speed pulley assembly 152 to the BISG 154 is that switching the speed ratio of the assembly 152 does not affect the speed ratio between the crankshaft and the other accessories. The FEAD 150, in one or more other embodiments, may be modified to have a dedicated belt between the multi-speed pulley assembly 152 and the crankshaft similar to FIG. 4B described above.

Figure 6:
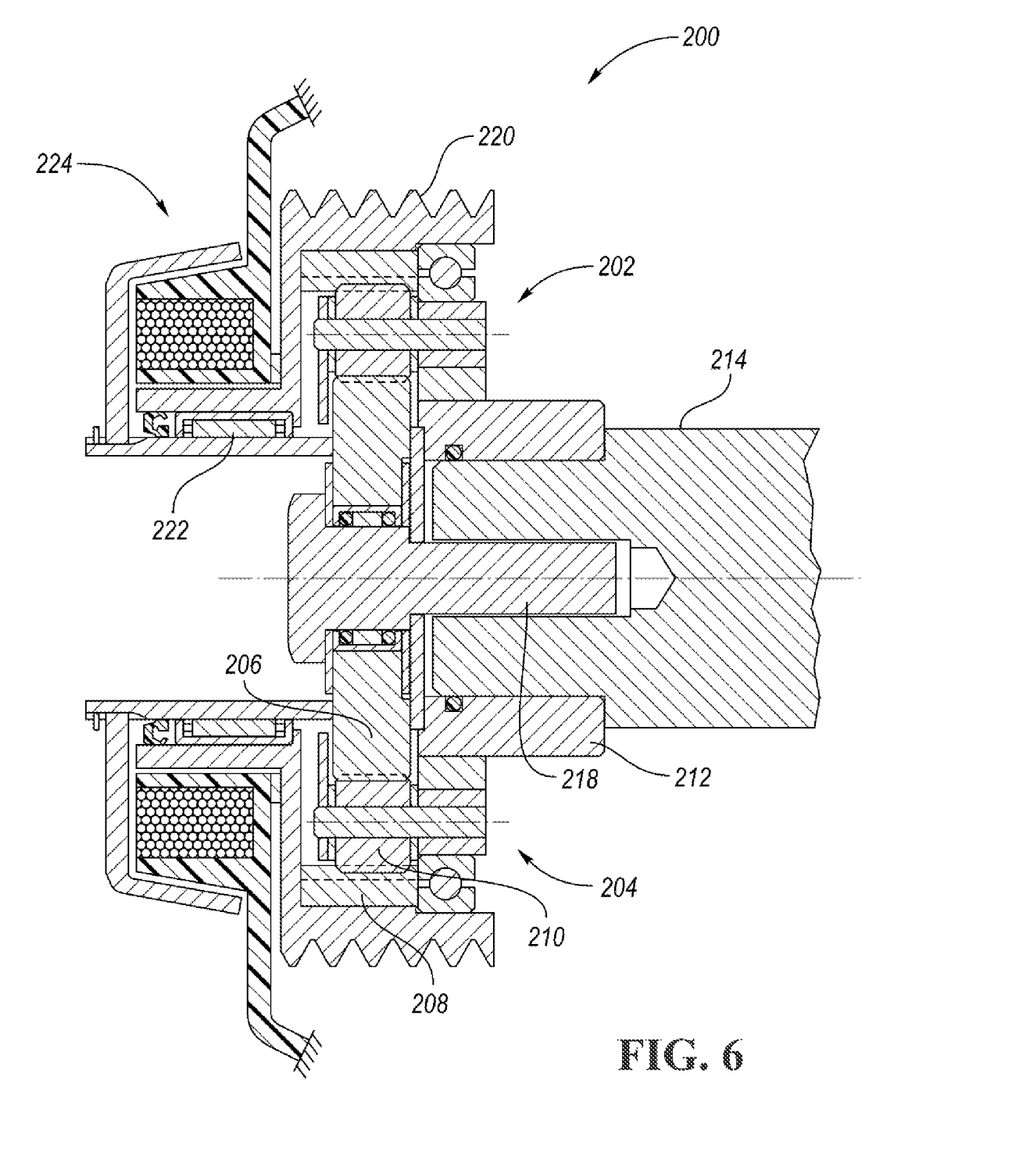
FIG. 6 is a side cross-sectional view of a multi-speed pulley assembly according to one embodiment of this disclosure.

FIG. 6 illustrates an example multi-speed pulley assembly 200 according to one or more embodiments. The multi-speed pulley assembly 200 may be mounted to a crankshaft of the engine. The assembly 200 includes a gearing arrangement 202, which may be in the form of a planetary gearset 204. Planetary gearset 204 includes a sun gear 206, a ring gear 208, planet gears 210, and a planet carrier 212. In the illustrated embodiment, the planet carrier 212 is the input and the ring gear 208 is the output. The planet carrier 212 may be rotationally fixed to a shaft 214, such as a crankshaft of the engine or a rotor shaft of an electric machine. The gearing arrangement 202 may be concentrically supported relative to the shaft 214. The sun gear 206 may be connected to the shaft 214 by a bolt or other fastener 218. The sun gear 206 is supported for relative movement with the shaft 214. For example, the sun gear 206 may be seated on a bearing that circumscribes the fastener 218. The ring gear 208 may be formed on an inner diameter of a pulley 220. An outer diameter of the pulley 220 is configured to engage with a tension member of the FEAD.

A one-way clutch 222 engages between the pulley 220 and an extended hub 222 of the sun gear 206. The one-way clutch 222 prevents the ring gear 208 from rotating slower than the sun gear 206 while permitting to the ring gear 208 to rotate faster than the sun gear when the clutch overruns, i.e., the pulley 220 can rotate faster than the shaft 214 but cannot rotate slower.

The assembly 200 includes a controllable two-way clutch 224 that selectively holds one of the components of the planetary gearset 202 to create a speed ratio between the input and the output. The clutch may be an electromechanical clutch having an engaged and disengaged condition. In the illustrated embodiment, the clutch 224 is operable to hold the sun gear 206. The clutch 224 may be an electronically controlled clutch that includes an electric coil 226. Energizing the coil 226 engages the clutch to hold the sun gear 206 stationary, and de-energizing the coil 226 releases the sun gear 206. The illustrated clutch 224 is sometimes referred to as a cone clutch. The clutch 224 is controllable by the controller 50.

The multi-speed pulley assembly 200 has two speeds: a high speed ratio between the pulley 220 and the shaft 214 when the clutch 224 is engaged and a low speed ratio when the clutch is disengaged. In the illustrated embodiment, the low speed ratio is direct drive and the pulley 220 rotates in unison with the shaft 214. When the clutch 224 is disengaged, the one-way clutch ties the ring gear 208 to the sun gear 206 resulting in no relative movement between the components of the planetary gearset 204 resulting in direct drive. When the clutch 224 is engaged, the sun gear 206 is held creating a speed ratio between the carrier 212 and the ring gear 208 according to the relative tooth counts of components. The gearset 204 is configured to rotate the ring gear 208 faster than the carrier 212 when the sun gear 206 is held to create the high speed ratio.

The multi-speed pulley assembly 200 is also configured to permit rotation of the pulley 220 (in the direction of overrun) when the shaft is stopped. In embodiments where the shaft 214 is the crankshaft, this allows to the BISG to run the other accessories when the engine is OFF. This functionality may allow for the elimination of accessory electric actuators for the water pump, the air conditioner, etc., as the BISG can now be used to power these devices when the engine is OFF.

While the gearing arrangement is illustrated as being a planetary gearset, other speed modifying arrangements are contemplated, such as a CVT, a jack-belt system, a centrifugally-actuatable and speed-limiting mechanism, or the like. A multi-speed pulley assembly similar to assembly 200 may be mounted to the rotor shaft of the BISG in other embodiments.

In alternative embodiment, the speed modifier for the FEAD is not mounted to either the engine or the BISG. Instead, the speed modifier may be off-axis. Here, a first belt may output the crankshaft power to the off-axis speed modifier that is then connected to the BISG (and possibly other accessories) by one or more other belts. In this regard, this disclosure contemplates any FEAD design in which multiple speed ratios are possible between the engine and the BISG.

The low speed ratio of the FEAD may be the default ratio that is normally used and the high speed ratio may be used when conditions require either faster operation of the BISG or a larger torque output of the BISG. The controller 50 may control operation of the FEAD based on sensed conditions as will be described in detail below.

Control logic or functions performed by controller 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

Figure 7:
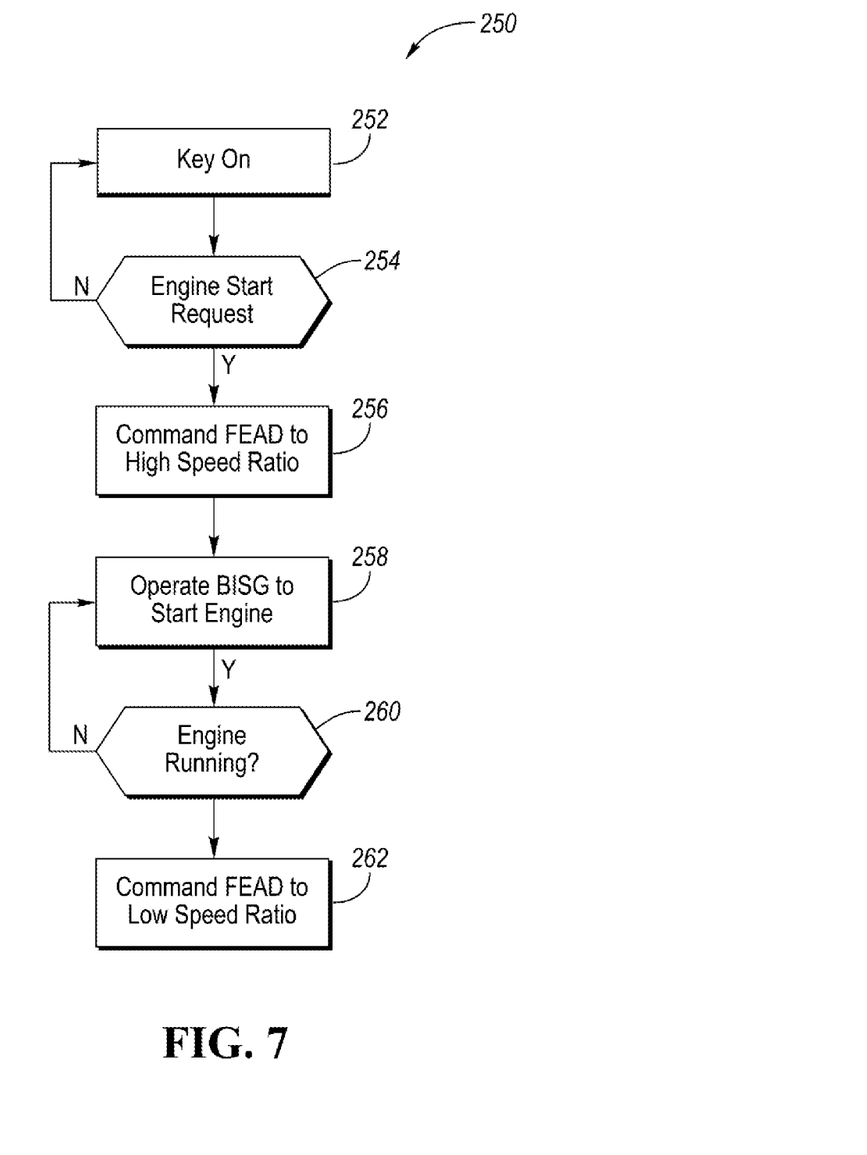
FIG. 7 is a flowchart of an algorithm for controlling starting a stationary vehicle with a BISG and a multi-speed front end accessory drive.

FIG. 7 is a flowchart 250 of an algorithm for controlling a vehicle including a BISG and an FEAD with multiple speed ratios. The flowchart 250 illustrates controls for starting a stationary vehicle with the BISG. Control begins at operation 252 when a Key-On condition is sensed. In operation 254 controller determines if an engine start request has been received. If no, control loops until an engine start request is received. Once the request is received control passes to operation 256 and the controller commands the FEAD to the high speed ratio to increase torque ratio between the BISG and the engine. At operation 258, the BISG is operated to start the engine. At operation 260, the engine is monitored to determine if the engine is running or still in the process of starting. For example, the controller may monitor the speed of the engine and other factors to determine that stable combustion of the engine has been achieved. Once the engine is started, the controller commands the FEAD to the low speed ratio at operation 262.

Figure 8:
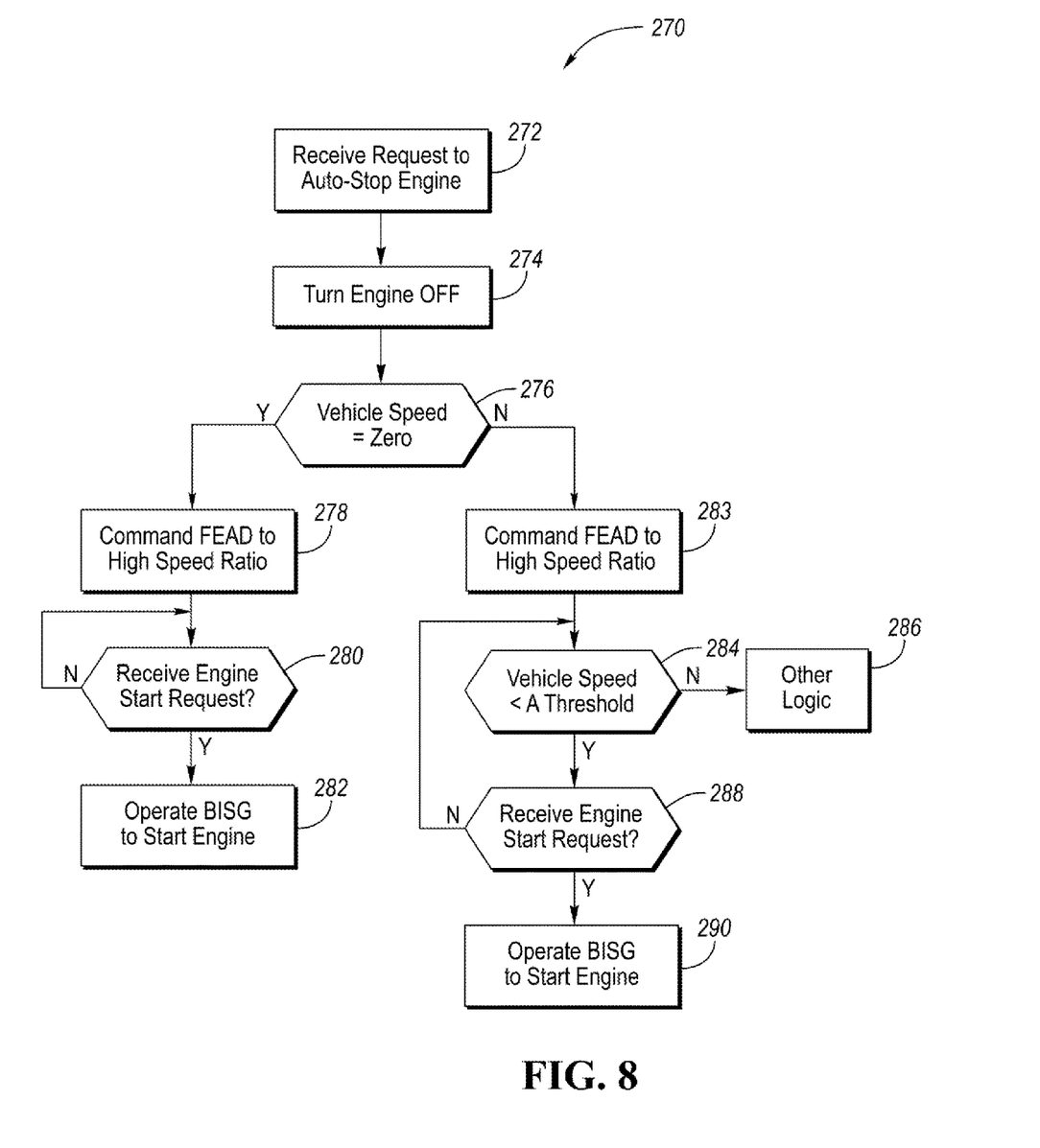
FIG. 8 is a flowchart of an algorithm for controlling start-stop of an engine having a BISG and a multi-speed front end accessory drive.

FIG. 8 is a flowchart 270 for controlling engine start-stop. Control begins at operation 272 with a request to auto-stop the engine. The engine is then turned off at operation 274. At operation 276 the controller determines if the vehicle speed is equal to zero. If yes, the vehicle is in a stationary start stop condition and control passes to operation 278. At operation 278, the controller commands the FEAD to the high speed ratio in preparation for an engine start. The controller determines if an engine start request has been received at operation 280. The engine start request may be issued in response to the brake pedal being released, the accelerator pedal being depressed, and/or other sensed conditions. If yes, control passes operation 282 and the BISG is operated to start the engine.

If no at operation 276, the vehicle is in a rolling stop-start condition in which the vehicle is coasting with the engine OFF. At operation 283, the controller commands the FEAD to the high speed ratio. At operation 284, the controller determines if the vehicle speed is less than a threshold. The threshold may be 2 MPH for example. The threshold is used to determine if the vehicle speed is within a range appropriate for auto starting the engine with the BISG. If the vehicle speed is not less than the threshold at operation 284, then the vehicle is moving too quickly to ensure proper auto starting with the BISG, and control is passed to other logic 286. If yes at operation 284, the controls and monitor for an engine start request at operation 288. The engine start request may be issued in response to depression of the accelerator pedal, a request for additional driver-demanded torque, and others. Once a request is received, control passes operation 290 and the controller operates the BISG to start the engine.

Figure 9:
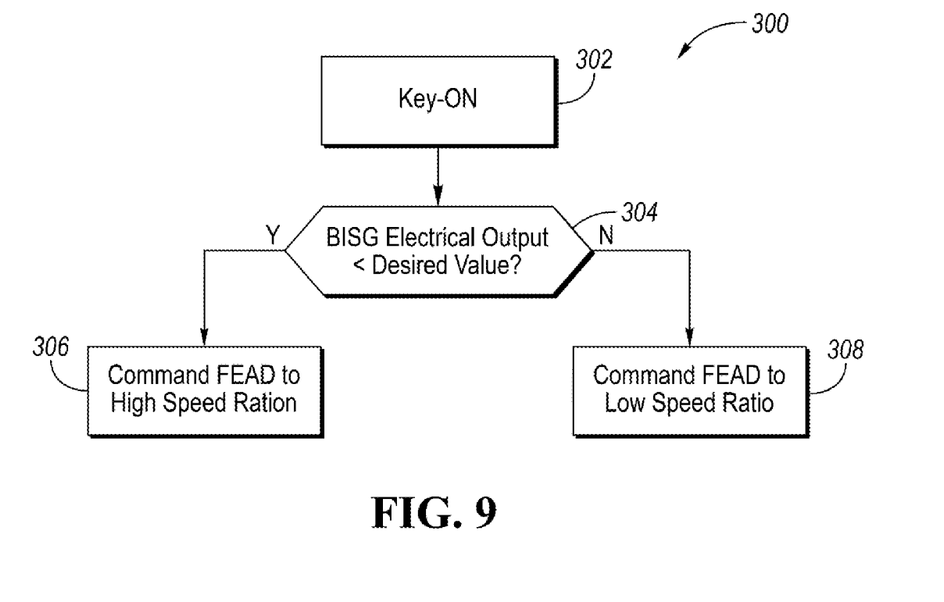
FIG. 9 is a flowchart of an algorithm for controlling a speed ratio of a multi-speed front end accessory drive based on electrical output of the BISG.

FIG. 9 is a flowchart 300 for controlling the speed ratio to ensure a desired electrical output of the BISG is maintained. Control starts at operation 302 when Key-On is detected. At operation 304, the controller determines if the BISG electrical output is less than a desired value. If no, the controller commands the FEAD to the low speed ratio, or alternatively, takes no action if the FEAD is already in the low speed ratio. If yes at operation 304, control passes to operation 306 and the controller commands the FEAD to the high speed ratio to increase electrical output of the BISG.

Figure 10:
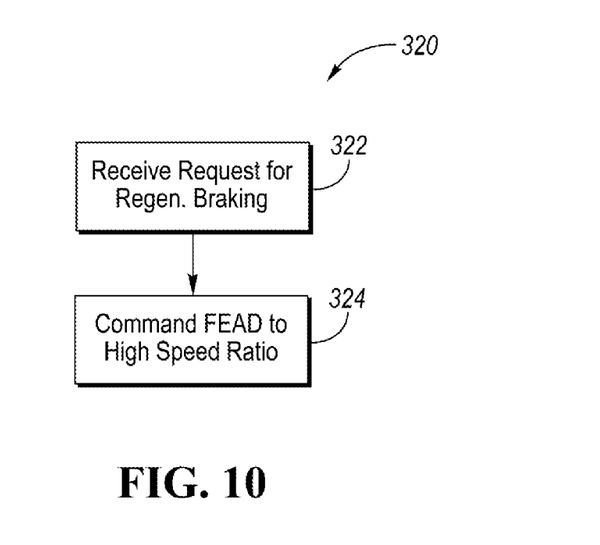
FIG. 10 is a flowchart of an algorithm for controlling a speed ratio of a multi-speed front end accessory drive during regenerative braking.

FIG. 10 is a flowchart 324 controlling the speed ratio during regenerative braking. As discussed above, increasing the speed ratio between the BISG and the crankshaft generally increases the power output of the BISG particularly for engine speed ratio associated with regenerative braking. Additionally, the higher speed ratio increases negative torque at the crankshaft. At operation 322, the controller receives a request for regenerative braking. In response, the controller commands the FEAD to the high speed ratio at operation 324 to increase the effectiveness of energy recapture.

In addition to the above described functionalities provided by the multi-speed FEAD and BISG arrangement of the disclosure, the arrangement may also allow a mild-hybrid to be propelled using only the BISG. Typical mild hybrids are unable to propel without engine power. Here, the torque advantage created by the high speed ratio allows the BISG (at least in some embodiments) to propel the vehicle at creep speeds, e.g., below 5 MPH.

The embodiments of the present disclosure may include various internal and external circuits or other electrical devices. All references to the circuits and other electrical devices and the functionality provided by each, are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of discrete passive and active components such as resistors, capacitors, transistors, amplifiers, analog/digital converters (ADC or A/D converters), microprocessors, integrated circuits, non-transitory memory devices (e.g., FLASH, random access memory (RAM), read only memory (ROM), electrically programmable read only memory (EPROM), electrically erasable programmable read only memory (EEPROM), or other suitable variants thereof) and software which cooperate with one another to perform operation(s) disclosed herein. In addition, any one or more of the electric devices may be configured to execute a computer program that is embodied in a non-transitory computer readable storage medium that includes instructions to program a computer or controller to perform any number of the functions as disclosed.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
an engine including a crankshaft;
an electric machine including a shaft;
a front end accessory drive (FEAD) including a tension member operably connecting the crankshaft and the shaft and a gearing arrangement configured to establish a first speed ratio between the crankshaft and the shaft when in a first condition and a second speed ratio between the crankshaft and the shaft when in a second condition, wherein the second speed ratio is higher than the first speed ratio; and
a controller programmed to:
in response to a request to start the engine with the electric machine, (i) command the gearing arrangement to the second condition and (ii) command the electric machine to start the engine, and
in response to (i) the engine being OFF, (ii) a speed of the vehicle being greater than zero and less than two miles per hour, and (iii) the driver depressing an accelerator pedal, (i) command the gearing arrangement to the second condition and (ii) command the electric machine to start the engine.

2. The vehicle of claim 1, wherein the controller is further programmed to, in response to an electrical power output of the electric machine being less than a desired value, command the gearing arrangement to the second condition to increase the electrical power output.

3. The vehicle of claim 1, wherein the controller is further programmed to, in response to a request for regenerative braking with the electric machine, command the gearing arrangement to the second condition to increase an electrical power output of the electric machine and increase a negative torque at the crankshaft.

4. The vehicle of claim 1, wherein the gearing arrangement is mounted to the shaft of the electric machine.

5. The vehicle of claim 1, wherein the gearing arrangement is mounted to the crankshaft.

6. The vehicle of claim 1, wherein the gearing arrangement includes a planetary gearset.

7. The vehicle of claim 6, wherein the gearing arrangement further includes an electrically controllable clutch operate to place the gearing arrangement in the first and second conditions.

8. The vehicle of claim 1, wherein the gearing arrangement includes:
an electrically controllable clutch,
a pulley engageable with the tension member, and
a planetary gearset having a sun gear fixed to the clutch, a ring gear fixed to the pulley, and a planet carrier fixed to the crankshaft or the shaft of the electric machine, wherein the gearing arrangement is in the first condition when the clutch is disengaged and is in the second condition when the clutch is engaged.

9. The vehicle of claim 1 further comprising:
a water pump including a pulley connected to the tension member; and
an air-conditioning unit including a pulley connected to the tension member.

10. A vehicle comprising:
an engine including a crankshaft;
an electric machine including a shaft;
a front end accessory drive (FEAD) including a tension member operably connecting the crankshaft and the shaft and a gearing arrangement configured to establish a first speed ratio between the crankshaft and the shaft when in a first condition and a second speed ratio between the crankshaft and the shaft when in a second condition, wherein the second speed ratio is higher than the first speed ratio, wherein the gearing arrangement includes:
an electrically controllable clutch,
a pulley engageable with the tension member,
a planetary gearset having a sun gear fixed to the clutch, a ring gear fixed to the pulley, and a planet carrier fixed to the crankshaft or the shaft of the electric machine, wherein the gearing arrangement is in the first condition when the clutch is disengaged and is in the second condition when the clutch is engaged, and
a one-way clutch connected between the ring gear and the sun gear; and
a controller programmed to, in response to a request to start the engine with the electric machine, (i) command the gearing arrangement to the second condition and (ii) command the electric machine to start the engine.

11. A vehicle comprising:
an engine including a crankshaft;
an electric machine including a shaft;
a front end accessory drive (FEAD) including a multi-speed pulley assembly mounted to one of the crankshaft and the shaft, a pulley mounted to the other of the crankshaft and the shaft, and a tension member trained around the multi-speed pulley assembly and the pulley, wherein the multi-speed pulley assembly is configured to establish a low speed ratio between the shaft and the crankshaft and a high speed ratio between the shaft and the crankshaft; and
a controller programmed to:
in response to a request for regenerative braking with the electric machine, command the multi-speed pulley assembly to establish the high speed ratio, and
in response to (i) the engine being OFF, (ii) a speed of the vehicle being greater than zero and less than two miles per hour, and (iii) the driver depressing an accelerator pedal, command the multi-speed pulley assembly to establish the high speed ratio.

12. The vehicle of claim 11, wherein the controller is further programmed to, in response to a request to start the engine with the electric machine, command the multi-speed pulley assembly to establish the high speed ratio.

13. The vehicle of claim 11, wherein the controller is further programmed to, in response to an electrical power output of the electric machine being less than a desired value, command the multi-speed pulley assembly to establish the high speed ratio.

14. The vehicle of claim 11, wherein the multi-speed pulley assembly is mounted to the shaft of the electric machine.

15. The vehicle of claim 11, wherein the multi-speed pulley assembly is mounted to the crankshaft.

16. The vehicle of claim 15, wherein the multi-speed pulley assembly includes a second pulley and a gearing arrangement, wherein the gearing arrangement rotationally fixes the second pulley to the crankshaft when in the low speed ratio and the second pulley rotates faster than the crankshaft when in the high speed ratio.

* * * * *